United States Patent Office 2,895,993
Patented July 21, 1959

2,895,993

ALKYL SUBSTITUTED ANHYDROTETRACYCLINE COMPOUNDS AND PROCESS OF PREPARING THE SAME

Charles R. Stephens, Jr., Niantic, Conn., assignor to Chas. Pfizer & Co., Brooklyn, N.Y., a corporation of Delaware No Drawing. Application May 16, 1957
Serial No. 659,482

2 Claims. (Cl. 260—559)

This invention is concerned with a process for the preparation of certain novel organic compounds and with the new compound thus prepared. In particular, it is concerned with 5a,6-anhydrotetracycline, 5a,6-anhydrochlortetracycline, and 5a,6-anhydrobromtetracycline nuclearly substituted in the D-ring by certain hydrocarbon substituents. This application is a continuation-in-part of copending application Serial Number 508,813 filed May 16, 1955 and now abandoned.

The process of the present invention comprises reacting either tetracycline, chlortetracycline, or bromtetracycline or their 5a,6-anhydro derivatives that is 5a,6-anhydrotetracycline, 5a,6-anhydrochlortetracycline, or 5a,6-anhydrobromotetracycline, with an olefinic compound under substantially anhydrous conditions in the presence of a strong acid. Under the conditions of this reaction tetracycline, chlortetracycline, and bromtetracycline, when employed as the starting material, are dehydrated at the 5a,6-position so that the same alkylated product is obtained regardless of whether the antibiotic or its anhydro compound is employed. The olefins employed in the process of the present invention have up to about nine carbon atoms and at least one of the unsaturated carbon atoms is substituted by alkyl groups or by an aryl (aromatic hydrocarbon) group. These olefins provide carbonium ions in the reaction mixture under the conditions of the present process. The carbonium ion is the reactive intermediate. Other substances such as tertiary alcohols, benzyl-type alcohols and certain esters and ethers of these alcohols which similarly provide carbonium ions under these reaction conditions are also operable in the present process. It is preferred, however, to employ either the olefin itself, a tertiary alkanol, or a benzyl-type alcohol, that is a 1-aryl substituted alkanol. Each of these preferred reactants may contain up to about nine carbon atoms.

The process of the present invention is conducted in the presence of strong acid condensing agent either an organic acid or a mineral acid. Suitable acids include sulfuric acid and the aromatic sulfonic acids such as p-toluenesulfonic acid, benzenesulfonic acid, naphthylenesulfonic acid, etc. Acidic condensing agents are, of course, to be avoided which are capable of reacting with the tetracycline or anhydrotetracycline starting material employed. This includes such acids as hydrogen iodide, perchloric acid, etc. The reaction may be most suitably conducted in a solvent which is inert to the reactants, the products, and to the condensing agent. Suitable solvents include preferably the lower alkanoic acids such as acetic acid, propionic acid, and butyric acid. Other suitable solvents include carbon tetrachloride, carbon disulfide, and nitrobenzene. The lower alkanoic acids, however, afford the most satisfactory results and are preferred. The presence of the solvent helps to control the reaction so that decomposition of the starting material and of the product is avoided. The temperature of the reaction mixture is controlled for the same reason. Polymerization of the olefin reactant is also minimized by the presence of a solvent and by control of the temperature. In general, in the operation of the present process at least about a molar quantity of each the antibiotic compound and the olefinic compound are used together with an excess of the strong acid condensing agent, that is more than one molar proportion of the strong acid condensing agent.

It had been shown in copending application Serial No. 507,123 filed May 9, 1955 by Charles R. Stephens, Jr. that the nitriles of oxytetracycline, chlortetracycline and tetracycline and certain related compounds may be condensed similarly with olefinic compounds. However, the nitriles always form N-alkylated derivatives although concurrent C-alkylation may also occur. In the present process only C-alkylation occurs. The reaction conditions are such that primarily monoalkylated products are obtained although it is possible to produce dialkylated materials particularly when employing tetracycline or anhydrotetracycline which are unsubstituted at the 7-position. It is thought that alkylation occurs primarily at the 9-position in the present process, and for convenience these valuable new products are sometimes referred to as 9-alkylated anhydrotetracyclines. This, however, has not been firmly established. The products of the present invention are more precisely then referred to as D-ring nuclearly substituted 5a,6-anhydrotetracycline antibiotic compounds since it is not known definitely at which position substitution occurs. It is known, however, that substitution occurs in the D-ring and that the phenolic hydroxyl group in the 10-position remains undisturbed as does the halogen in the 7-position of chlortetracycline or bromtetracycline.

The present process may be illustrated by the following formulas:

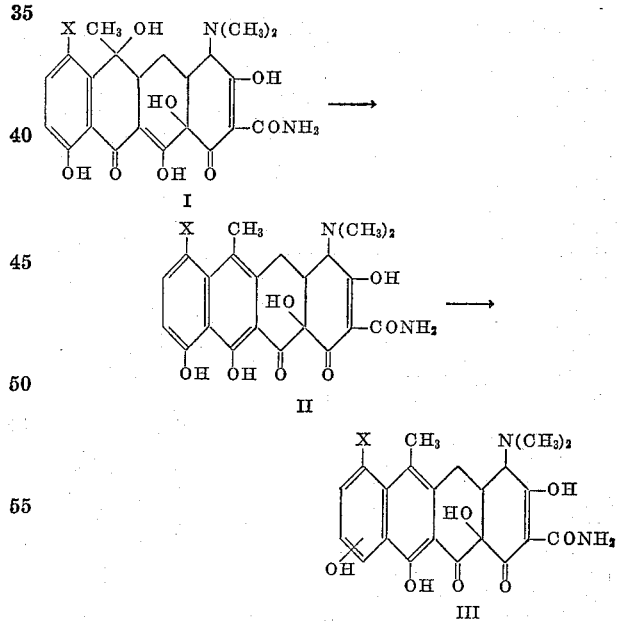

Structure I or II represents the starting material, that is the antibiotic compound or the anhydro antibiotic compound, and structure III represents the product, that is, the D-ring nuclearly substituted anhydrotetracycline antibiotic compound. In the above formulas, X represents a hydrogen atom, a chlorine atom, or a bromine atom. Y is a hydrocarbon containing up to about 9 carbon atoms and selected from the group consisting of

and

Wherein $R_1$ is aryl, $R_2$ and $R_3$ are selected from the group consisting of hydrogen and alkyl and $R_4$, $R_5$, and $R_6$ are alkyl. Oxytetracycline has been employed in the present process, but both it and 5a,6-anhydrooxytetracycline are too unstable to afford readily isolable products under the present process conditions.

In conducting the present process, the starting material, that is, the antibiotic or antibiotic derivative, is dissolved in a solvent, for instance, acetic acid, and the strong acid which is to be used as a condensation agent is added gradually, with cooling to about 5° C. to 15° C. and stirring the reaction mixture throughout the addition. The olefinic compound, alcohol, or related compound is then added and the temperature of the reaction mixture is maintained at a low temperature for a short time. It may then be maintained at the low temperature, that is, from about 5° to about 15° C., for an extended period of time to complete the reaction or the mixture may be allowed to reach room temperature, that is from about 20° to about 35° C., and the reaction is completed in a somewhat shorter time. The rate of reaction will vary somewhat with the particular condensation agent used. The specific order of addition of the reagents is not critical. It may be altered, but care must be taken to avoid excessive rise in temperature which may lead to decomposition of the starting material and of the product. If polymer is formed during the condensation by interreaction of the olefinic compound, this material may be extracted by a hydrocarbon solvent, for instance, pentane, hexane, and so forth. The extraction may be conducted on the reaction mixture after the reaction has been completed, as long as the solvent used for the reaction is immiscible with the hydrocarbon solvent used for removal of the polymer. Alternatively, the reaction solvent may be removed for instance by evaporation and polymeric material leached from the residue.

The condensation product obtained by the reaction of one molecule of the olefin or equivalent compound with one molecule of the antibiotic compound may be isolated by adding the reaction mixture to ice or to ice water. Adjustment of the pH to a value of around 4 to 6 will facilitate the separation of the solid product from the aqueous system since water-soluble salts are sometimes formed from the present products with strong acids. The product may be isolated by extraction or filtration. If a water-immiscible solvent is used, it may be necessary to remove this, for instance, by distillation. The product is sometimes obtained in crystalline form by this simple process but frequently an amorphous product is obtained. Such material, obtained in non-crystalline form, may be further purified by crystallization from a solvent or by other methods, but the amorphous powders are useful and are sometimes preferred. An alternative method for isolating the product of the reaction is the addition of a non-solvent for the product, such as pentane or hexane, to the reaction mixture and the isolation of the solid which separates.

The olefins and related compounds used as one of the starting materials in the present process include aliphatic olefins, cyclo-olefins, aryl-substituted olefins, and derived compounds. Examples of the type of compounds which may be utilized are isobutylene, diisobutylene, octenes, tertiary butanol, camphene, dimethylbenzylcarbinol, benzyl alcohols, tertiary amyl alcohol, hexene, heptene, allylbenzene, and so forth.

The reaction products of the present process, structure III above, are active antimicrobial agents having certain advantages over the parent antibiotic compounds and over the corresponding anhydro compounds. One such advantage shared by many of the present materials over both the parent tetracycline antibiotics and the anhydro compounds is derived from differences in their antimicrobial spectra which facilitates their use in the treatment of Trichomonas vaginitis. The present materials are highly active against Trichomonas vaginalis but they have reduced antibacterial activity particularly against Gram negative species. Anhydrochlortetracycline and anhydrotetracycline, which are also active against Trichomonas vaginalis although to a somewhat lesser degree have very strong antibacterial activity. For the treatment of Trichomonas vaginitis, this is disadvantageous since a disruption of the normal bacterial flora of the affected organ results making possible fungal overgrowths which are frequently more troublesome than the original infection. With the agents of the present invention, the effect on the normal bacterial population is minimized while the infection by T. vaginalis is inhibited. These substances are also highly active against pin worm in mice. This helminth is similar in its morphological characteristics to nematodes of human and veterinary importance.

A further advantage of the present 9-alkyl-anhydrotetracyclines for the above uses is that they are less soluble than the parent compounds. Thus for topical and non-systemic applications such as the treatment of Trichomonas vaginitis or in use as anthelmintics, less of the material is dissolved thus reducing absorbtion and irritation, and the active ingredient is not readily washed from treated surfaces.

The antibacterial and antitrichomonal activities of anhydrotetracycline, the so-called 9-t-butylanhydrotetracycline, anhydrochlortetracycline, and the so-called 9-t-butylanhydro- and 9-benzylanhydrochlortetracyclines are compared in Table I.

TABLE I

Comparative antibacterial activities [1]

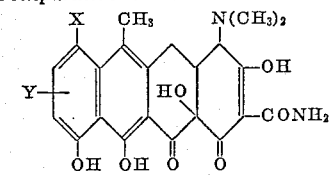

| Organism | (1) X=H Y=H | (2) X=H Y=t-butyl | (3) X=Cl Y=H | (4) X=Cl Y=t-butyl | (5) X=Cl Y=benzyl |
|---|---|---|---|---|---|
| T. vaginalis [2] | 6.25 | 0.78 | 6.25 | 0.78 | 50 |
| A. aerogenes AC [2] | 1.56 | | 6 | | <6 |
| A. aerogenes MT [2] | 1.56 | | 3 | | <6 |
| A. aerogenes parent | 3.12 | >100 | 6 | 100 | 12 |
| B. subtilis | 0.78 | 0.19 | 0.39 | 0.19 | <6 |
| M. pyogenes | 0.78 | 0.78 | 6 | 50 | <6 |
| S. faecalis | 1.56 | | 1 | 50 | <6 |
| S. paratyphi A (134) | 3.12 | | 6 | | 12 |
| S. paratyphi B (139) | 6.25 | | | | 25 |
| S. typhosa | 3.12 | >100 | 6 | 100 | 12 |
| K. pneumoniae | 3.12 | >100 | 12 | 100 | 12 |
| E. coli | 3.12 | >100 | 12 | 100 | 25 |
| B. bronchisepta | 3.12 | | 12 | | 25 |
| C. albrians | 50 | 6.25 | 12 | 50 | 25 |
| Proteus sp | 6.25 | >100 | >100 | 100 | 50 |
| Pseudomonas sp | 50 | >100 | >100 | 100 | 100 |
| Mycobacterium No. 607 | 0.28 | 3.12 | | 25 | 50 |

[1] Minimum inhibitory concentrations in mcg./ml.
[2] Tetracycline and chlortetracycline have values of 125 and 500 mcg./ml., respectively. Oxytetracycline has a MIC of 1000 mcg./ml.

The in vitro evaluation of antitrichomonal activity was carried out in simplified trypticase serum medium (A. B. Kupfberg et al., Proceedings of the Society for Experimental Biology and Medicine 67, 304 (1948)). A 0.05 ml. aliquot of 48 old cultures of T. vaginalis containing approximately 150,000 actively motile organisms was inoculated into each tube. The ten tube two-fold serial dilution technique was used and the minimum inhibitory concentration (MIC) determined after a 48-hour incubation period at 37° C. The antibacterial results were obtained by a standard serial dilution procedure.

It is apparent from this table that oxytetracycline, chlortetracycline and tetracycline have very low antitrichomonal activities. Anhydrotetracycline and tetracycline, columns 1 and 3, have a reasonable degree of activity but much lower for instance than that of the so-called 9-t-butyl compounds of the present invention, columns 2 and 4.

The corresponding reduction in antibacterial activity for the present substances is also apparent. The antimicrobial activity of the D-ring benzyl substituted anhydrochlortetracycline compound, column 5, parallels that of anhydrotetracycline and anhydrochlortetracycline. It is thus useful for much the same purposes as these two substances, but has the extra advantage of low solubility setting it off for topical and non-systemic applications.

The in vitro antitrichomonal activity was confirmed in vivo in mice. Infections were produced by inoculating *T. vaginalis* into the dorsal subcutaneous tissue of albino mice. In each instance the number of trichomonads inoculated was approximately 1.5 million. Drugs were administered at the site of infection commencing 24 hours after inoculation and were continued once daily for five consecutive days. The mice were held for two days after the completion of the treatment and were then sacrificed and examined macroscopically for abcess formation and microscopically for the presence of *T. vaginalis*. By this technique the so-called 9-t-butylanhydrochlortetracycline at a dosage level of 25 mg./kg. cleared 60% of the mice of the infection while at a dosage of 300 mg./kg., 100% cures were effected. Similar results were obtained with the so-called 9-t-butyl-anhydrotetracycline although this material was somewhat less active effecting a 75% cure at the 300 mg./kg. dosage. The best cure rate obtainable with anhydrotetracycline and anhydrochlortetracycline at 300 mg./kg. was 70% while at 25 mg./kg. the rate dropped to 25–50%.

The D-ring nuclearly alkylated anhydrotetracycline antibiotic compounds of the present invention have the further advantage over the corresponding 5a,6-anhydrotetracycline antibiotic compounds of being active anthelmintic agents. The search for new and more effective drugs for the treatment of human enterobiasis has led to the use of related oryurids in laboratory animals. A convenient technique for testing compounds for this use has been developed by Chan (American Journal of Hygiene, 56, 22 (1952)). Male mice weighing between 13 and 15 g. were infected with *S. obvelata* by placing them with infected mice for eight days. On the eighth day the newly infected mice were removed from the colony and treatment was effected for two days after exposure, that is, on the eighth and ninth days. At autopsy two days after completion of treatment, the cecum of each mouse was opened into a shallow Petri dish containing a zinc solution and the number of worms exclusive of reinfection larva was counted under a dissecting microscope. Control mice were maintained and examined similarly and the percent reduction in worm burden observed in each treated mouse calculated. The results are arranged in Table II.

TABLE II

*Pin worm reduction in mice*

| Compound | Levels, mg./kg. | Number mice | Average worm burden | | Percent reduction |
|---|---|---|---|---|---|
| | | | Treated | Controls | |
| Anhydrotetracycline | 1,000 | 5 | 38 | | 64.0 |
| | 500 | 5 | 98 | | 7.5 |
| | 250 | 5 | 116 | | −9.4 |
| Infected controls | | 5 | | 106 | |
| 9-t-butylanhydrochlortetracycline. | 1,000 | 10 | 0 | | 100.0 |
| | 500 | 10 | 14 | | 88.0 |
| | 250 | 10 | 84 | | 20.0 |
| Infected controls | | 10 | | 117 | |

The contrasting activity between anhydrotetracycline and the D-ring t-butyl derivative is most apparent at the 500 mg./kg. dosage level. The alkylated material of the present invention reduced the worm burden by 88% while anhydrotetracycline effected a reduction of only 7.5%. At a dosage of 1000 mg./kg. the present t-butyl compound effected a 100% clearance of the helminths.

The compounds of the present invention are amphoteric forming salts with both a variety of strong acids and with various organic and inorganic bases and particularly with the alkali and alkaline earth metals, calcium, strontium, barium, potassium, lithium, sodium, cesium and so forth. Complex derivatives of metal salts such as calcium chloride, magnesium chloride, nickel chloride, iron chloride, antimony trichloride and a variety of other metallic salts may also be prepared. The acids which may be utilized for formation of salts include inorganic acids, such as hydrochloric acid, hydrobromic acid, phosphoric acid, sulfuric acid, nitric acid and others of this nature as well as strong organic acids for instance, p-toluenesulfonic acid, benzenesulfonic acid, and naphthylenesulfonic acid. For the therapeutic use of the products of the present invention in the form of salts, it is preferred to employ pharmacologically acceptable metal or acid addition salts. By pharmacologically acceptable salts is meant those containing acids and metals which are non-toxic at the concentrations necessary in drug treatment with the salts.

Compounds of the present invention when employed in the treatment of helminthic infestations of man and animals are administered orally. This is readily accomplished by the incorporation of these materials into tablets, capsules, or liquid preparations of various types such as syrups, elixirs, suspensions, etc. containing various excipients, flavors, taste masking substances and preservatives. A dosage of about 1 to 2 g. of active ingredient per day according to the size and age of the patient is recommended.

For use in the treatment of trichomonas vaginitis, topical application in the form of jellies, solutions, insufflation powders, or vaginal tablets is convenient and effective. Jellies may be prepared from a petroleum base containing lactose or other active ingredients and excipients in addition to a product of the present invention. Similarly, powders can be prepared comprising various inert carriers such as talc along with lactose, various wetting agents, etc. A concentration of about 0.1% of one of the present D-ring alkylated anhydrotetracyclines is recommended for both of these forms. Vaginal tablets are prepared weighing, for example, about 1.5 g. and containing about 1.0 to 1.2 g. of lactose and the balance made up of various detergents, wetting agents, and buffers in addition to the active ingredient. Such a tablet advantageously then contains from about 5 to 10 mg. of one of the valuable D-ring substituted anhydrotetracyclines of the present invention and buffers to afford a pH of about 4.5.

The following examples are provided to further illustrate the specific manner in which the present invention is practiced. Many variations, of course are possible without departing from the spirit and scope thereof.

EXAMPLE I

A mixture of 5 grams of tetracycline and 50 milliliters of glacial acetic acid was cooled at 10° C. and treated with 10 milliliters of concentrated sulfuric acid. The mixture was maintained at about 10° C. and 5 grams of tertiary amyl alcohol was added gradually. The mixture was maintained for a period of 48 hours at 5° C. The solution was then shaken with an equal volume of pentane to remove any polymers of amylenes. The acetic acid phase was separated and poured into 500 milliliters of a mixture of ice and water. The mixture was neutralized with sodium carbonate and the product was extracted with several one-hundred milliliter portions of chloroform. The chloroform extract was washed with water, dried and concentrated under vacuum, and tertiary-amylanhydrotetracycline was obtained as an orange solid product. It was found that the crystalline product was effective against *Trichomonas vaginalis*.

EXAMPLE II

A mixture of 5 grams of chlortetracycline and 50 milliliters of glacial acetic acid was treated with 9 milliliters of concentrated sulfuric acid. The mixture was cooled to 15° C. and isobutylene gas was bubbled through the liquid. The mixture was agitated continuously during the addition and a total of about 5 grams of isobutylene gas was added. The mixture was maintained at a temperature of about 30° C. for 172 hours. The solution was extracted with two fifty-milliliter portions of technical pentanes to remove polymerized isobutylene. The hydrocarbon layers were separated and the acetic acid solution was poured into 500 milliliters of ice water. The mixture was neutralized with potassium bicarbonate and the reaction product was extracted with four fifty-milliliter portions of methylene chloride. The extracts were combined, washed once with water, dried over anhydrous sodium sulfate and concentrated under vacuum. Tertiary-butylanhydrochlortetracycline separated in solid form. This product displayed ultraviolet absorption peaks in acidic methanol at 279, 445 m$\mu$, and a strong C-H infrared peak at 4.4 $\mu$.

*Analysis.*—Calcd. for $C_{26}H_{29}N_2O_7Cl$: C, 50.4; H, 5.8. Found: C, 61.0; H, 6.3.

This product proved highly effective in inhibiting various microorganisms. It showed a minimum inhibitory concentration of 0.78 mcg./ml. against *Trichomonas vaginalis*.

EXAMPLE III

The process of Example II is repeated with the substitution of 5a,6-anhydrochlortetracycline (C. W. Waller et al., J. Am. Chem. Soc. 74, 4981 (1952)) for the chlortetracycline and with nitrobenzene as the solvent rather than acetic acid. The product is recovered by evaporation of the solvent in vacuo and trituration of the residue with pentane. It is identical with the product of Example II.

EXAMPLE IV

A mixture of chlortetracycline hydrochloride (2.6 g., .005 mole), glacial acetic acid (25 cc.), concentrated sulfuric acid (5 cc.), and benzyl alcohol (0.01 mole, 1 cc.) was maintained at room temperature (approximately 30° C.) for 64 hours. The solution was then treated with excess ether, whereupon 29 grams of orange amorphous acid salt separated. When this was dissolved in water and adjusted to pH 4.5 by addition of sodium carbonate, amphoteric benzylanhydrochlortetracycline separated in amorphous form. This solid was extracted with boiling ether. The ether was then dried over anhydrous sodium sulfate and evaporated. From this solution benzylanhydrochlortetracycline separated in crystalline form.

*Analysis.*—Calcd. for $C_{29}H_{28}N_2O_7Cl$: C, 63.1; H, 5.1; N, 5.1. Found: C, 62.9; H, 5.0; N, 5.2.

This product inhibited *Trichomonas vaginalis* at a concentration of 50 mcg./ml.

EXAMPLE V

The process of Example IV is repeated with the substitution of bromtetracycline (P. Sensi et al., Il Farmica—ed. sc. 10, 337–345 (1955)) for the chlortetracycline hydrochloride. The product corresponds in composition to benzylanhydrobromtetracycline and possesses anti-trichomonas activity. Similar results are obtained employing 5a,6-anhydrobromtetracycline (loc. cit.) in place of the bromtetracycline.

EXAMPLE VI

A mixture of 5 g. of 5a,6-anhydrotetracycline (C. W. Waller et al., J. Am. Che. Soc. 74, 4981 (1952)) and 100 ml. of acetic acid was cooled to 10° C. and treated with 10 g. of p-toluenesulfonic acid. The mixture was maintained at about 10° and 5 g. of a mixture of pentenes rich in 2-methylbut-2-ene was added. The mixture was maintained for a period of 48 hours at 5° C. The reaction was then worked up in the fashion described in Example I affording a similar product although in somewhat lower yield than obtained in Example I.

EXAMPLE VII

The process of Example II is repeated employing propionic acid as the solvent. The product is isolated in a similar fashion affording a product identical with that described in Example II.

EXAMPLE VIII

The process of Example IV is repeated substituting phenylmethylcarbinol for the benzyl alcohol reactant, and employing a somewhat longer reaction period of about 72 hours. By this procedure $\alpha$-phenylethylanhydrochlortetracycline is obtained.

EXAMPLE IX

The process of Example II was repeated employing 10 g. of $\beta$-naphthalene sulfonic acid as the condensing agent in place of sulfuric acid. A similar product was obtained to that provided by Example II.

EXAMPLE X

The process of Example IV is repeated substituting styrene for the benzyl alcohol, and employing a reaction period of 72 hours. The product obtained appeared to be identical with the phenylethylanhydrochlortetracycline obtained in Example VIII.

What is claimed is:

1. The process which comprises reacting at a temperature from about 5° to about 35° C. in an inert substantially anhydrous organic solvent a compound selected from the group consisting of tetracycline, 5a,6-anhydrotetracycline, chlortetracycline, 5a,6-anhydrochlortetracycline, bromtetracycline, and 5a,6-anhydrobromtetracycline with at least a molar proportion of a compound having up to nine carbon atoms and selected from the group consisting of olefinic hydrocarbons containing an alkyl substituent on at least one of the unsaturated carbon atoms, olefinic hydrocarbons containing an aryl substituent on one of the unsaturated carbon atoms, tertiary alkanols, and 1-aryl substituted alkanols in the presence of an excess of an acid selected from the group consisting of sulfuric acid and an aryl sulfonic acid.

2. A compound selected from the group consisting of the D-ring nuclearly substituted compounds selected from the group consisting of 5a,6-anhydrotetracycline, 5a,6-anhydrochlortetracycline, and 5a,6-anhydrobromtetracycline, wherein said D-ring nuclear substituent is a hydrocarbon containing up to 9 carbon atoms and selected from the group consisting of

and

wherein $R_1$ is aryl, $R_2$ and $R_3$ are selected from the group consisting of hydrogen and alkyl and $R_4$, $R_5$, and $R_6$ are alkyl.

References Cited in the file of this patent

Waller et al.: "J. Am. Chem. Soc.," vol. 75 (1953) pp. 4981 and 4982.

Hochstein et al.: "J. Am. Chem. Soc.," vol. 75 (1953) pp. 5455 to 5475.

Stephens et al.: "J. Am. Chem. Soc.," vol. 76, July 5, 1954, pp. 3568 to 3575.

Boothe et al.: "Antibiotics Annual," 1953–1954, pp. 46 to 48.

UNITED STATES PATENT OFFICE
Certificate of Correction

Patent No. 2,895,993                                              July 21, 1959

Charles R. Stephens, Jr.

It is hereby certified that error appears in the printed specification of the above numbered patent requiring correction and that the said Letters Patent should read as corrected below.

Column 2, lines 52 to 58, Formula III, should appear as shown below instead of as in the patent:

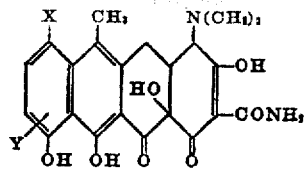

column 4, lines 4, 11, and lines 25 and 26, for "*Trichomonas vaginitis*", each occurrence, read —trichomonas vaginitis—; column 5, lines 5 and 6, for "tetracycline" read —anhydrochlortetracycline—.

Signed and sealed this 22nd day of March 1960.

[SEAL]

Attest:
KARL H. AXLINE,
*Attesting Officer.*

ROBERT C. WATSON,
*Commissioner of Patents.*